Sept. 11, 1962  R. L. CLEGG  3,054,087
EXCESSIVE SPEED WARNING SYSTEM FOR TRAFFIC CONTROL
Filed Dec. 29, 1958
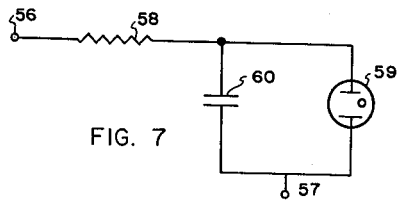
FIG. 7
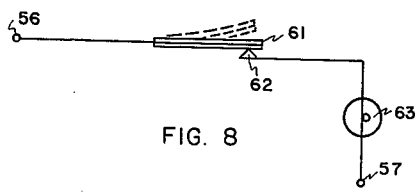
FIG. 8
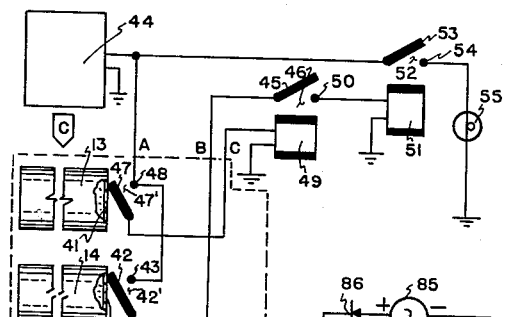
FIG. 5
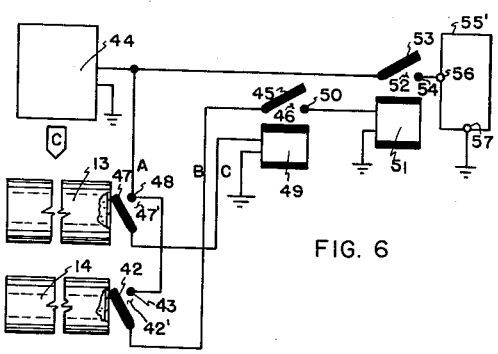
FIG. 6
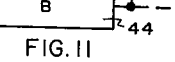
FIG. 11
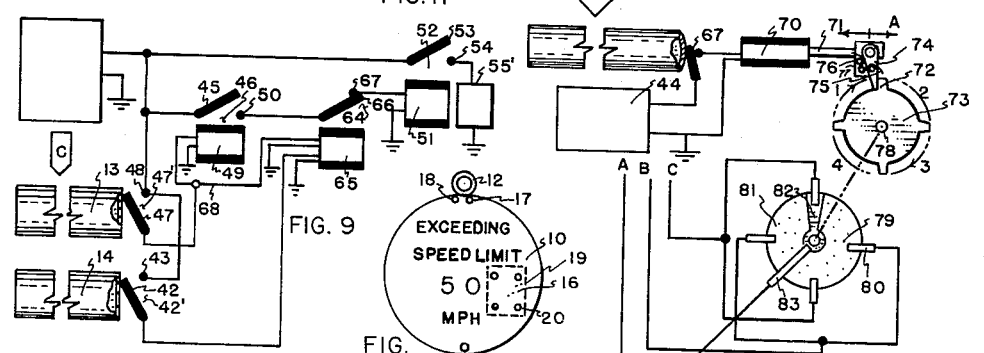
FIG. 9  FIG. 2A  FIG. 10
FIG. 2B(1)
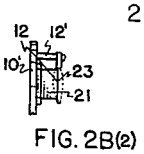
FIG. 2B(2)
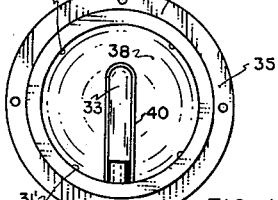
FIG. 3  FIG. 4
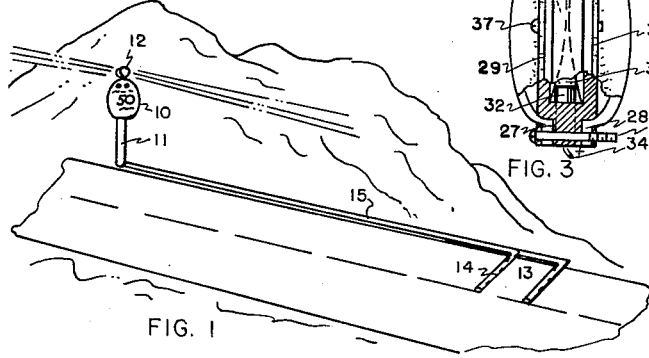
FIG. 1
INVENTOR.
RUE L. CLEGG
BY M. Ralph Shaffer
HIS ATTORNEY

United States Patent Office 3,054,087
Patented Sept. 11, 1962

3,054,087
EXCESSIVE SPEED WARNING SYSTEM FOR TRAFFIC CONTROL
Rue L. Clegg, 968 E. 27th South, Salt Lake City, Utah
Filed Dec. 29, 1958, Ser. No. 783,581
1 Claim. (Cl. 340—31)

This invention relates to excessive speed warning systems for traffic control and, more particularly, to a new and improved warning system of the type described which notifies both the approaching motorist and also observers which might be stationed on the other side of the system indicator (in the direction of travel of the motorist) that the speed limit for the area is being exceeded by him.

In the past many types of excessive speed warning systems have been devised, both for permanent installation in the automobile proper and for permanent or temporary installation by the roadside. Systems which are installed in the automobile proper so as to give a visual indication of excessive speed both to the driver and to highway observers have proven impractical because of relatively high cost of installation of such systems in automobiles and the necessary duplicity of apparatus by virtue of installation in each automobile. Clearly, the most practical approach is to have a highway system which may be temporarily or permanently installed at a selected point along the highway roadside to give indications of excessive speed to motorists and also to observers stationed down the road, and this without the employment of expensive radar equipment or other type electromagnetic communication, expensive transmission lines or telemetering apparatus.

The present invention is believed to be superior to that heretofore devised in that it is extremely inexpensive to produce, much less complex than other systems heretofore devised and gives at once an indication to the motorist and to an observer stationed perhaps three-quarters of a mile down the road that the motorist is speeding.

Accordingly, an object of the present invention is to provide a new and useful, excessive speed warning system for traffic control which will be compact, extremely inexpensive to produce and highly reliable, to give merely the indication that the speed limit is being exceeded by an approaching motorist.

It is a further object of the present invention to provide an excessive speed warning system for traffic control of the type described wherein an indication of excessive speed may be seen both by the approaching motorist and by a patrol car observer or other person stationed down the road some distance from the indicator itself, and this without the employment of electromagnetic transmission, telemetering apparatus, or extensive transmission lines.

According to the present invention either one or two air hose switches (having expandable diaphragms for closing the normally open switches when an automobile passes over the same) are coupled to a pair, or perhaps three, relays. Relays employed are "time delay opening" relays the contacts of which are normally open. This is to say, energization of the relays closes the contacts immediately for a certain period of time, after which the relay contacts open to their initial inoperative condition. The types of relays which may be used to accomplish this "time delay" are many and varied, such as the flux delay type, electronic relays, motor driven relays, pneumatic relays, etc. Where two air hose switches are used the spacing between the air hoses will be related to the time delay of the aforementioned relay such that the time required for an automobile to traverse the distance between the air hose switches will equal the time delay of the relay. In a preferred form of the invention the contacts of this first relay are placed in a series with the control (such as the winding) of a second relay which, preferably, is also of a time delay type. The delay time of this second relay is sufficient to actuate and power a light indicator means (either of the steady-state or flasher type) for the desired time interval for observation by the motorist and such observers as may be stationed down the road. Also connected in series with the control of this second relay is the second air hose switch. The operation of the apparatus thus becomes clear. Should the driver be exceeding the speed limit, then he will traverse the second hose switch and thus close this switch during the time that the first relay contacts remain closed; hence, the second relay is energized so as to close the contacts leading to the light means. If, however, the motorist is going slowly so that he does not traverse the second hose before the time of opening of the contact of the first relay, then, even though the second hose switch is closed, the second relay will not be energized so as to light the lamp, by virtue of the first relay, open contact condition.

Where a single air hose switch is used a ratchet system is employed so as to insert the switch, alternatively, in either the contact or the control circuit previously mentioned.

The light indicator itself, which may be either of a steady-state or flasher type, is designed to be seen on both sides thereof; thus, both the approaching motorist and observers down the road will be able to see the light indication.

The power supply, if taking form of a convenient D.C., dry cell storage battery, may be shunted by photosensitive means such as a bank of "solar cells" to keep up the charge of the battery. A series opposed, bucking diode of the crystal type may be inserted in the circuit connection of the solar cell bank to the battery so as to prevent the battery from discharging through the solar cells during night-time operation.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

FIGURE 1 is a perspective view of the excessive speed indicating system of the present invention when the same is installed, either temporarily or permanently, at a desired highway location.

FIGURE 2A is an elevation of the speed limit sign illustrated in FIGURE 1.

FIGURES 2B(1) and 2B(2) illustrate a modification of the basic sign illustrated in FIGURE 2A.

FIGURES 3 and 4 illustrate a representative form which the light indicator, illustrated in FIGURE 2A, may take.

FIGURES 5 and 6 are in schematic form and illustrate two forms which the electrical circuit of the system may take.

FIGURES 7 and 8 are alternative flasher circuits for employment in the circuit of FIGURE 6.

FIGURE 9 is a third circuit form which may be used in the system.

The apparatus shown in FIGURE 10 illustrates a manner in which but one highway hose switch may be employed in the system.

FIGURE 11 illustrates that each of the several electrical circuit embodiments may include photoelectric or "solar cell" means shunted across a D.C. battery supply so as to supply, by virtue of the action of the sun's rays upon the solar cells, a recharging current for the battery.

In FIGURE 1 the basic system is shown to consist of a speed limit sign 10 mounted upon a pole 11, a light 12 mounted to the sign 10, hose switches 13 and 14, and a three-wire cable 15 leading from the hose switches 13 and 14 to a relay unit 16 attached to the sign 10. (It will be shown hereinafter that instead of the employment of two highway hose switches, i.e. switches 13 and 14 in FIGURE 1, but one switch may be employed if desired.)

In FIGURE 2A the speed limit sign 10 is shown to include the usual indications (such as "speed limit—50 m.p.h.") and additionally includes the notation "exceeding." Preferably the letters of "exceeding" should be of a color (such as red) differing from that of the other speed limit sign notations. Attached to the sign 10 in proximity with the "exceeding" notation is the light 12, the same being secured to the sign 10 by means of screws 17 and threaded apertures 18. Other attachments may of course be used. The relay unit 16 may include a metal enclosure 19 (illustrated in the dotted lines in FIGURE 2A) and be secured to the sign 10 by means of screws 20 or other suitable attachments.

FIGURES 2B(1) and 2B(2) illustrate a modified sign 10' in fragmentary view wherein the letters forming the word "exceeding" are stamped from the sign so as to leave open areas or letter voids delineating the letters. A box-like reflector 21 frames the "exceeding" area of the sign and is provided with mounting flanges 22 and an open area 23. The mounting flanges 22 are secured to the sign by means of attachments 24 and the open area 23 of the reflector 21 is provided to admit the light indicator 12, the same including mounting spacers 12'.

As is seen in FIGURES 1–4 the light 10 is a two-direction light. This is to say, when the bulb within the light is lit the light therefrom will be seen both from in front and behind the same. Accordingly, and with reference to FIGURE 1, if a person drives his vehicle over the air hose switches 13 and 14 in FIGURE 1 in a manner as to exceed the speed limit at that particular point, then, not only will he be alerted by his excessive speed (by the flashing or other indication of light 12 in FIGURE 1) but also observers in a patrol car farther down the road will be able to see the flashing light and know that a car is approaching at a rate exceeding the speed limit.

The light 10 may take several constructions one of which is illustrated in FIGURES 3 and 4.

In FIGURES 3 and 4 the light 12 includes forward and rear, transparent lenses 25 and 26, respectively, each having an outer peripheral flange 27 and 28, respectively. Rings 29 and 30 secure the flanges of the two lenses to the lamp body 31, the same being shown in front elevation in FIGURE 4 and partially sectioned in FIGURE 3. The dotted lines in the base of the lamp body 31 in FIGURE 3 illustrate that the base 32 of lamp bulb 33 is threaded therein for mounting securement. An external lead 34 is disposed through this bulb mount and attaches to the mounting socket in a usual manner, with the casing of the bulb being grounded as indicaed. As may be seen with reference to FIGURE 4 the recessed, shoulder flange 35 permits the mounting thereon (on both sides) the two lenses together with the mounting rings. The assembly is held together by means of screws 37 lower ones of which may be elongated as at 37' provide for the mounting of the entire light assembly to the sign. As is indicated in FIGURES 3 and 4 the light may be supplied with medially attached, concave reflectors 38 and 39, both being supplied with cooperating, in-line recesses 40 to provide admittance access for the light bulb when mounted to lamp body 31, and both being soldered as at 31' or otherwise affixed within lamp body 31.

In FIGURES 5, 6, 9 and 10 the schematic representation C indicate an approaching automobile or other vehicle, the direction of the representation indicating the direction of travel of the same. Accordingly, the automobile or other vehicle will first cross the air hose 13 (in FIGURES 1, 5, 6 and 9) and subsequently will cross the air hose 14.

A consideration of the circuit diagram of FIGURE 5 will first be given. The several air hoses shown have closed ends, one of which constitutes a diaphragm 41 which expands outwardly when a vehicle passes over the air hose switch so as to contact associated switch contacts which are normally open. The expansion of the diaphragm 41 urges the switch arm 42 of switch 42' against its associated contact 43 which closes the circuit between power supply 44 and switch arm 45 of switch 46.

Thus, and in like manner, when a vehicle crosses over hose switch 13 (the first air hose contacted), the diaphragm 41 of the air hose switch is urged outwardly by virtue of the increased air pressure within the hose so as to force switch arm 47 of switch 47' against contact 48 so as to close the circuit between power supply 44 and control element 49 of relay 46. The remaining terminals of power supply 44 and control element 49 are maintained at a common reference potential (ground) as shown. Contact 50 of relay 46 is coupled through control element 51 of relay 42 to ground. Power supply 44 is coupled through switch arm 53 of normally open relay 52 to contact 54 and from thence through light 55 to ground. (The term "control element" is used to indicate the winding and core, for example, of the relay or other means which, when energized, will produce a closing of relay contacts.)

Both relays 46 and 52 are of the normally open, time delay opening type, i.e. when energized will remain closed for a definite time interval. The time delay of each relay and the respective function of each are best illustrated in a consideration of the operation of the basic system.

Consider the air hose pressure switches 13 and 14 in FIGURE 5 as being disposed a discrete distance apart as indicated in FIGURE 1, with the relays being disposed in housing 16 in FIGURE 2A and the light 55 in FIGURE 5 constituting the light 12 in FIGURE 1. When the automobile C in FIGURE 5 crosses over the first air hose switch, i.e. switch 13, the diaphrgam 41 will expand so as to close the normally open switch 47'. This in turn will energize relay 46 so as to close relay arm 45 against contact 50, thus supplying energizing current to control element 51 of relay 52 upon the closing of switch 42'. The time delay of relay 46 will be related to the spacing between air hose switches 13 and 14 so that the time delay of relay 46 will equal the time required for a vehicle to depress the second air hose switch, switch 14, after having passed over air hose switch 13, when going at a rate of speed equaling the speed limit at this particular area and indicated on sign 10. Where the device is designed to be portable, then the spacing between the hoses need only be adjusted so that the time interval required by the automobile to traverse the distance between the hoses and at a speed equal to the speed limit will equal the time delay of the relay. Two observations must be made at this point. In the first place, once the spacing between the two hoses has been adjusted, then, where the automobile travels at a rate slower than a given speed limit the relay 46 will open prior to the depression of switch 42' so that relay 52 in no event will be energized so as to light the light 55. Secondly, the spacing between the air hoses must be much greater than the spacing between the front and rear wheels of any conventional automobile so that the "start time" (relating to switch 13) will commence upon the passage of the rear wheels of the automobile being timed, these rear wheels merely reenergizing to maximum value the relay 46. The depression by the front wheels of the automobile of air hose switch 14 will determine the time of energization of relay 52 (assuming that relay 46 is still energized) so that the passage of the rear wheels of the automobile over air hose switch 14 either will have no effect whatever or will serve merely to increase slightly the time delay duration related to the supplying of power to light 55. Thus, the device of the present invention automatically takes into account the passage of both front and rear wheels of automobiles; hence, there need be no counting circuit or the like associated with the equipment so as to differentiate between front wheel and rear wheel, air hose switch depression.

The selection of relay 52 will be determined by that interval of time for which it is desired that the light flash, should a vehicle speed over the air hose switches. Once again, it is to be noted that should the vehicle be traveling slower than the rated speed limit, then relay 46 will open prior to the passage of the vehicle's front wheels over switch 14 so that the battery circuit to relay 52 will be interrupted.

The circuit of FIGURE 6 is identical with that of FIGURE 5, except that the light 55 is designated merely by a block 55' which is now referred to as a "flasher unit." Thus, instead of having a steady glow emanating from light FIGURE 5 for the time delay duration of relay 52, as illustrated in FIGURE 5, the light may be made to flash for the time duration of this relay. The flasher unit may take any one of several forms, two of which are illustrated in FIGURES 7 and 8. In FIGURE 7 is shown a conventional, R-C gas discharge tube flasher circuit. Thus, in FIGURE 7 resistor 58 is coupled at one end to input terminal 56 and at the remaining terminal through gas discharge tube 59, shunted by capacitor 60, to output terminal 57 which, as illustrated in FIGURE 6, is maintained as a common reference or ground potential. The circuit in FIGURE 7 is purely conventional. In operation, the capacitor 60 charges through resistor 58 until a potential is achieved across gas discharge tube 59 which causes the tube to fire, whereupon the capacitor 60 discharges through the tube until an extinction potential is reached; subsequently the capacitor 60 recharges through resistor 58 to repeat the cycle.

Another form of flasher circuit is illustrated in FIGURE 8 wherein a bi-metallic strip 61 is coupled at one end to input terminal 56 and at the remaining end through contact 62 and series-connected lamp 63 to output terminal 57. When the bi-metallic strip begins to conduct current to lamp 63, this lamp current will heat the bi-metallic strip so as to cause the same to bend away from contact 62, thereby interrupting the circuit. When the strip cools it will return to its initial, quiescent contact with the contact terminal 62. Thus, in FIGURE 8 it is seen that the lowermost half of bi-metallic strips 61 has the greater coefficient of thermal expansion relative to the upper half of the strip.

The circuits of either FIGURE 7 or FIGURE 8 may thus be employed in the flasher unit 55' of FIGURE 6. Accordingly, the flashing will persist for the time delay of relay 52.

FIGURE 9 is an additional embodiment of the present invention wherein an additional relay 64 is interposed and connected as shown. The arm 42 of switch 42' is connected through control 65 to ground. Correspondingly, arm 47 of switch 47', in addition to being connected to control 49 of switch 46 is also coupled through control 65 to ground. The two connections through control element 65 are in reality two windings the turns of which are reversed with respect to each other. Relay 64 is normally closed, as shown by the contact of arm 66 with contact 67.

The circuit of FIGURE 5 operates as follows. Upon the crossing by automobile C of air hose switch 13, normally open switch 47' will be closed, thus supplying energizing current to time relay 46 and also to relay 64. The air hose switches will be spaced apart in accordance with the time delay of relay 46, as before explained. Relay 64 may be either a time delay relay or a conventional latching relay. In the latter event, it will be the flux decay in control 49 which will induce flux within control 65 by virtue of current flow in conductor 68. In any event, relay 46 will remain closed for the specified period; however, upon actuation of switch 14 flux of opposite plurality will be induced in control 65 of relay 64 so as to return relay 64 to its normally closed position, thereby energizing relay 52 so as to cause flasher unit 55' to be operative. Again, actuation of switch 13 operates to close the contacts of relay 46 and to open the contacts of relay 64. Closing of the relay 64 contacts is accomplished by depression of air hose switch 14 within the time delay exhibited by relay 46.

FIGURE 10 illustrates a manner in which a single hose may be used to accomplish the desired result. Accordingly, the apparatus shown in FIGURE 10, when substituted for the apparatus contained in the dotted block of FIGURE 5, will perform the same desired result. In the apparatus of FIGURE 10 the single air hose is constructed as hereinbefore described with reference to hoses 13 and 14. The air hose switch is normally open; however, depression of the hose switch by the front wheels of an automobile, and subsequently by the rear wheels thereof, will cause a closure of the switch 69 so as to connect the power supply of 44 to solenoid 70. Solenoid 70 is designed so as to thrust solenoid shaft 71 in a direction A, thereby advancing the tooth 72 of ratchet wheel 73 from position "1" to position "2," the same being accomplished by pawl 74. Pawl 74 includes a spring 75 and spring pins 76 so as to withdraw the pawl over the teeth of the ratchet wheel when the shaft 71 is withdrawn by the solenoid. However, a block 77 rearwardly engages the pawl 74 so as to prevent rotation thereof in a counter-forward direction. A shaft 78 gangs ratchet wheel 73 to a rotary switch 79 which includes a plurality of mutually spaced brushes 80 and an insulation wheel 81 having a conductive segment 82. A brush 83 is permanently in engagement with the circular base of segment 82. Mutually opposed brushes are coupled together to points B and C as illustrated in FIGURES 5 and 10. The brush 83 is coupled via connector 84 to point A (see FIGURE 5).

The operation of the apparatus in FIGURE 10 is as follows. The forward wheels of the automobile depress the air hose switch 67 so as to close the same, thereby energizing solenoid 70 so as to advance the shaft of the solenoid in a direction A. This advancement causes the ratchet wheel to rotate one-quarter turn in a clockwise direction, advancing tooth 72 from position "1" to position "2." Subsequent operations will advance the ratchet teeth similar amounts. Actuation of this ratchet wheel causes a like rotation in shaft 78 and insulation wheel 81 of rotary switch 79. It will be noted that electrical contact between the segment 82 and the associated brush 80 occurs in between positions "1" and "2" of the ratchet wheel; further, depression of the air hose switch will transmit power, first to point C and then to point B, and alternating in that manner ad infinitum. Accordingly, the apparatus in FIGURE 10 supplants the two-switch system of FIGURE 5 illustrated in the dotted block thereof. Other than this, the circuit of FIGURE 5 will operate the same as previously indicated when the circuit of FIGURE 10 is substituted for the circuit within the dotted block form of FIGURE 5.

FIGURE 11 illustrates that power supply source 44, while the same may be of an A.C. supply (with the relays of the A.C. type), may well conventionally be of a D.C. nature such as a perpetually rechargeable dry-cell battery. When such is the case, the same may be shunted by a solar-cell unit 85 provided with a blocking crystal diode 86 to prevent discharge of the battery through the solar cell unit during night-time operation.

While, conceivably, variable time delay relays (and fixed-distance separated air hose switches) may be used to accommodate different areas the speed limits or warning starting point (the latter perhaps a few miles-per-hour above the posted speed limits) of which may differ, yet, for purposes of economy of system construction it is deemed desirable that to achieve versatility of system operation the distance between the air hose switches be made variable and the time delay character of the relays be respectively constant.

Where the subject relays are of the flux delay type, the term "control" refers to the relay winding unit.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A traffic control, excessive speed warning system for highway and road use including, in combination, a speed limit indicating sign mounted at a desired roadside point and facing oncoming traffic; light indicator means fixedly disposed with respect to and in proximity with said sign and observable, when electrically motivated, at least from the direction of oncoming traffic; first and second, spaced, normally open road switches transversely disposed on said road, removed from said sign in the direction of oncoming traffic, and actuatable by the tires of oncoming traffic; a power supply having one terminal maintained at a common reference potential and a remaining terminal coupled to one side of each of said road switches; first and second, normally open, time delay opening relays each having an energizable control element, a relay arm and a contact selectively engageable by said contact arm when said control element is energized, the time delay of said first relay equalling the time required for a vehicle traveling at the speed limit indicated by said sign to traverse the distance between said road switches, one side of each control element of each of said relays being maintained at said common reference potential, the remaining side of said first road switch being coupled to the remaining side of said control element of said first relay, said relay arm and contact of said first relay being electrically interposed between the remaining side of said second road switch and the remaining side of said second relay control element, said relay arm and contact of said second relay being electrically interposed between one terminal of said power supply and one side of said light indicator means, the remaining side of said light indicator means being coupled to the remaining power supply terminal.

References Cited in the file of this patent

UNITED STATES PATENTS

| | | |
|---|---|---|
| 2,150,776 | Moles | Mar. 14, 1939 |
| 2,186,922 | Hampton et al. | Jan. 9, 1940 |
| 2,229,234 | Williams | Jan. 21, 1941 |
| 2,325,435 | Sykora | July 17, 1943 |
| 2,371,909 | Naerbo | Mar. 20, 1945 |
| 2,616,957 | Thiem | Nov. 4, 1952 |
| 2,874,367 | De Palma | Feb. 17, 1959 |

FOREIGN PATENTS

| | | |
|---|---|---|
| 743,575 | Great Britain | Jan. 18, 1956 |